M. H. PEARSON.
SHOE SEWING MACHINE.
APPLICATION FILED JULY 23, 1900.
1,001,980.
Patented Aug. 29, 1911.
12 SHEETS—SHEET 6.
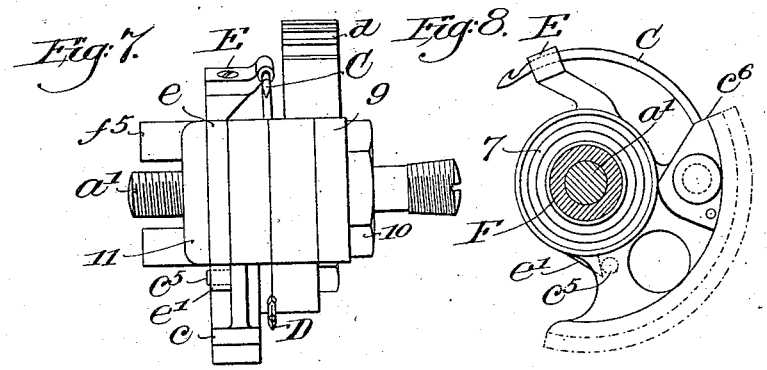
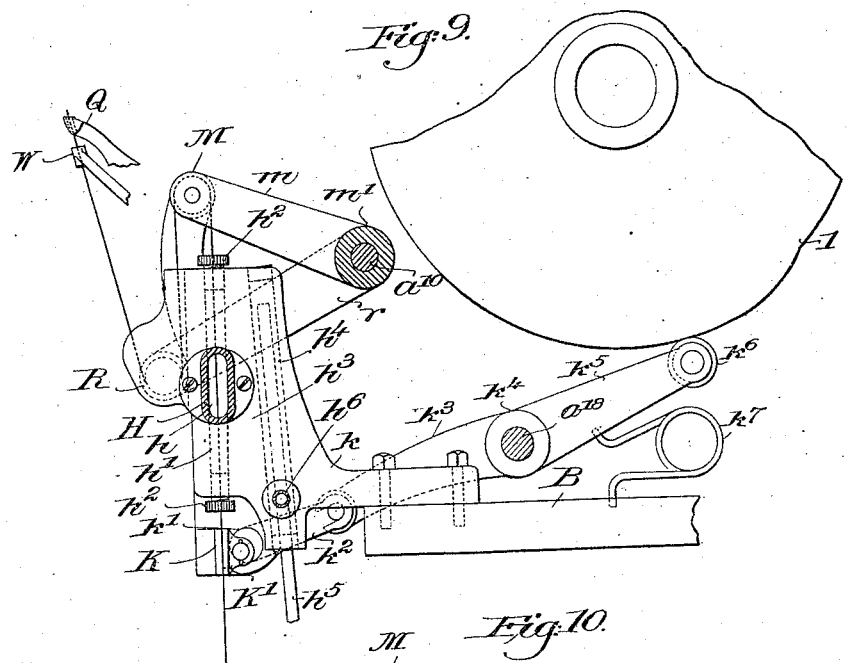
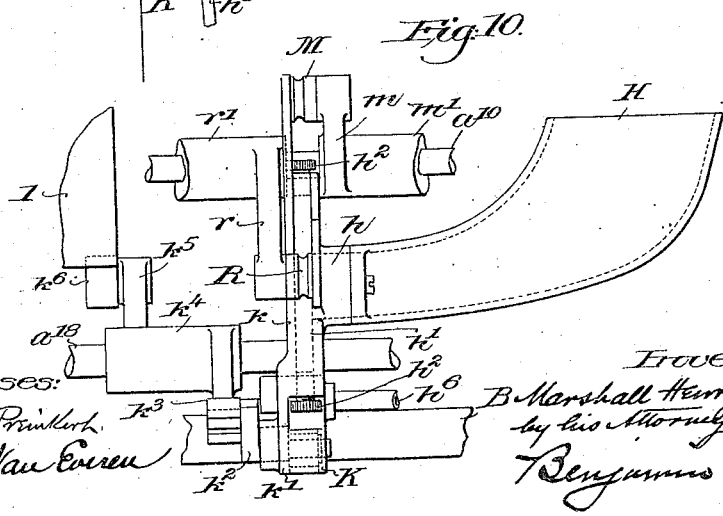
Witnesses:
John F. C. Prinkerh.
Horace Van Everen
Inventor:
B. Marshall Henry Pearson
by his Attorney
Benjamin Phillips

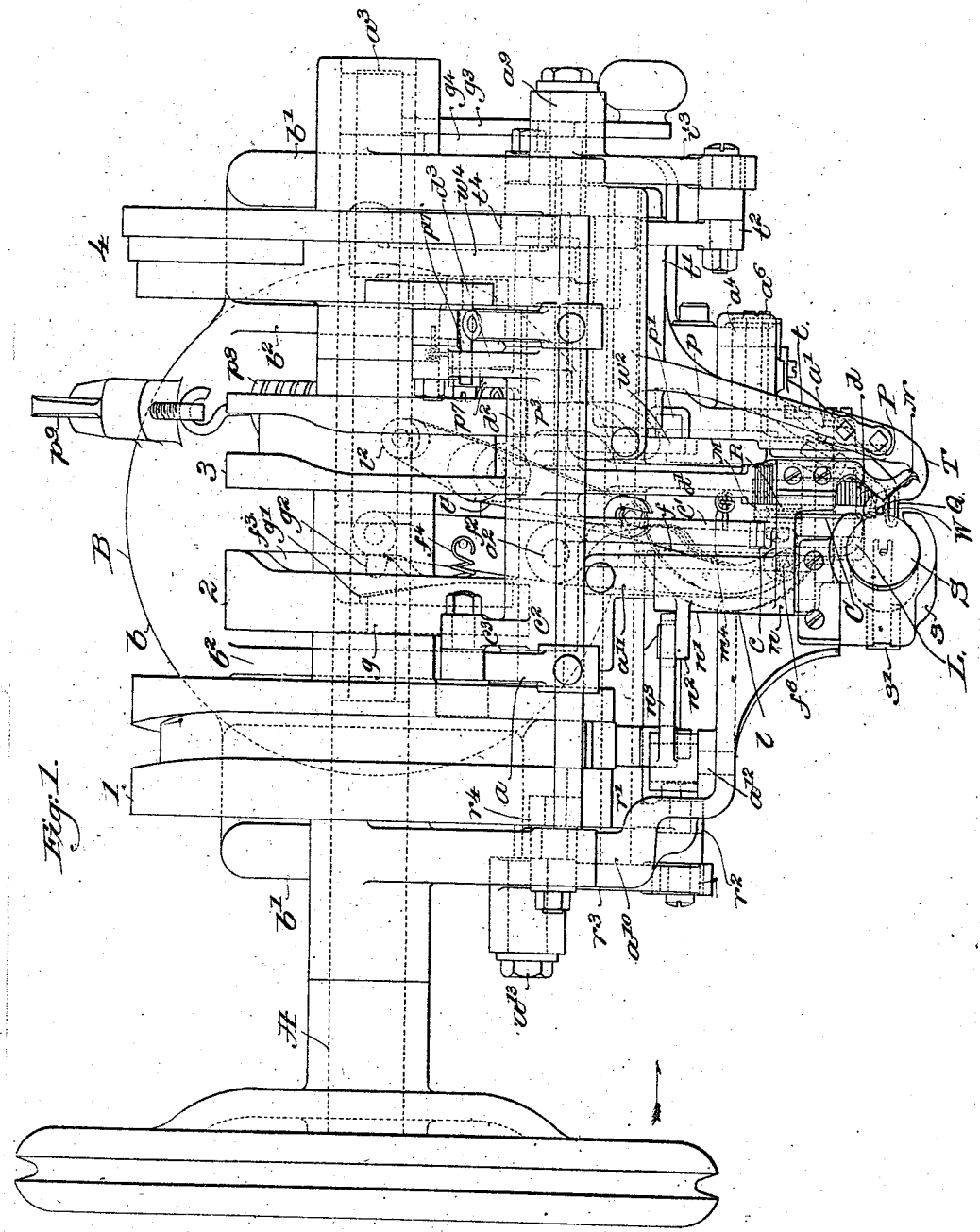

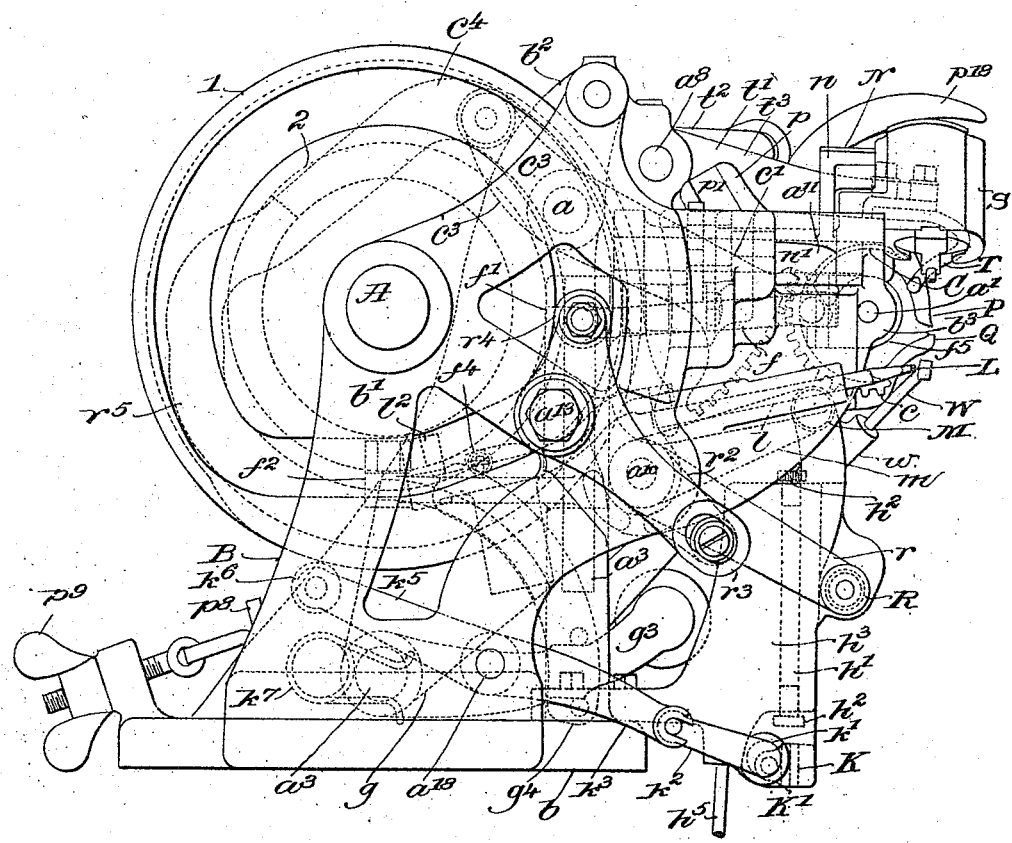

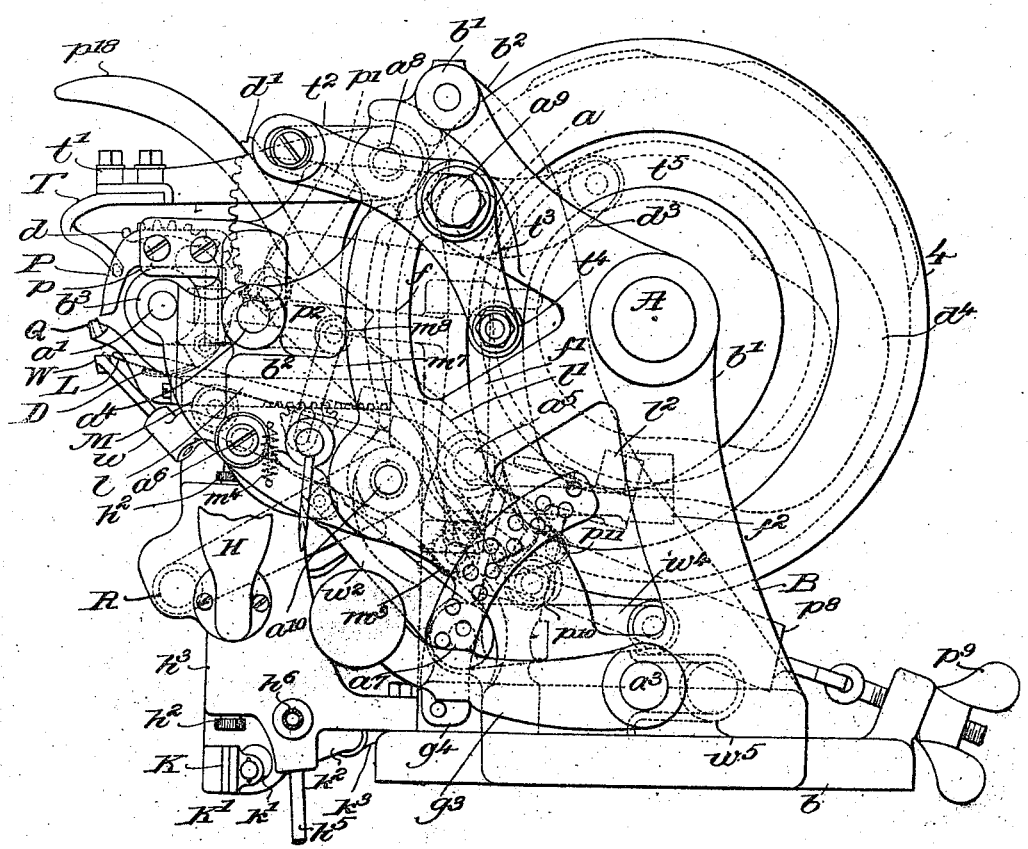

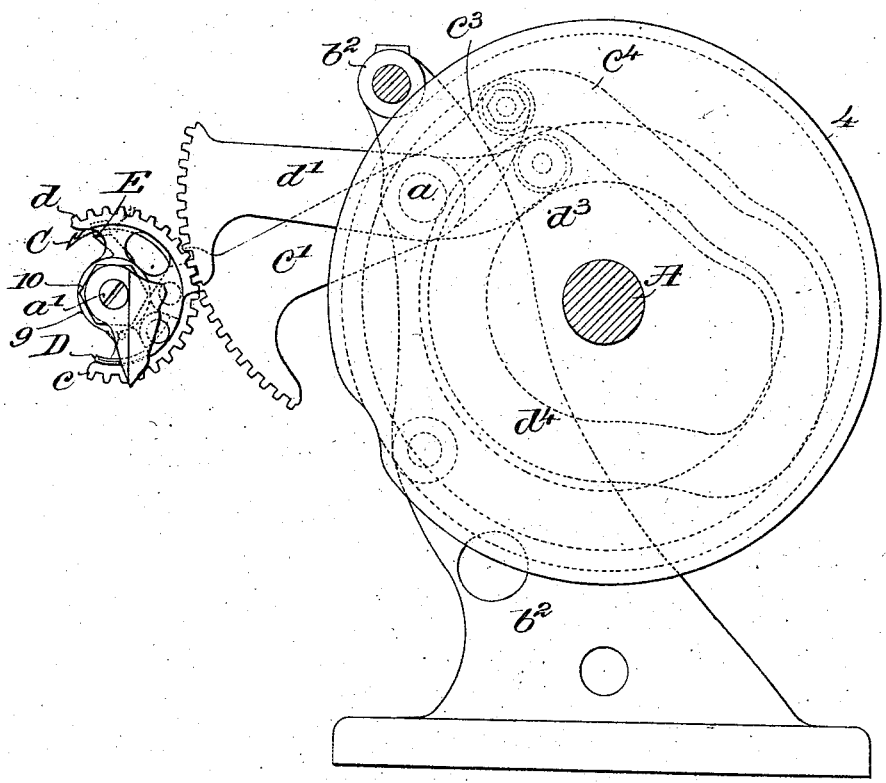

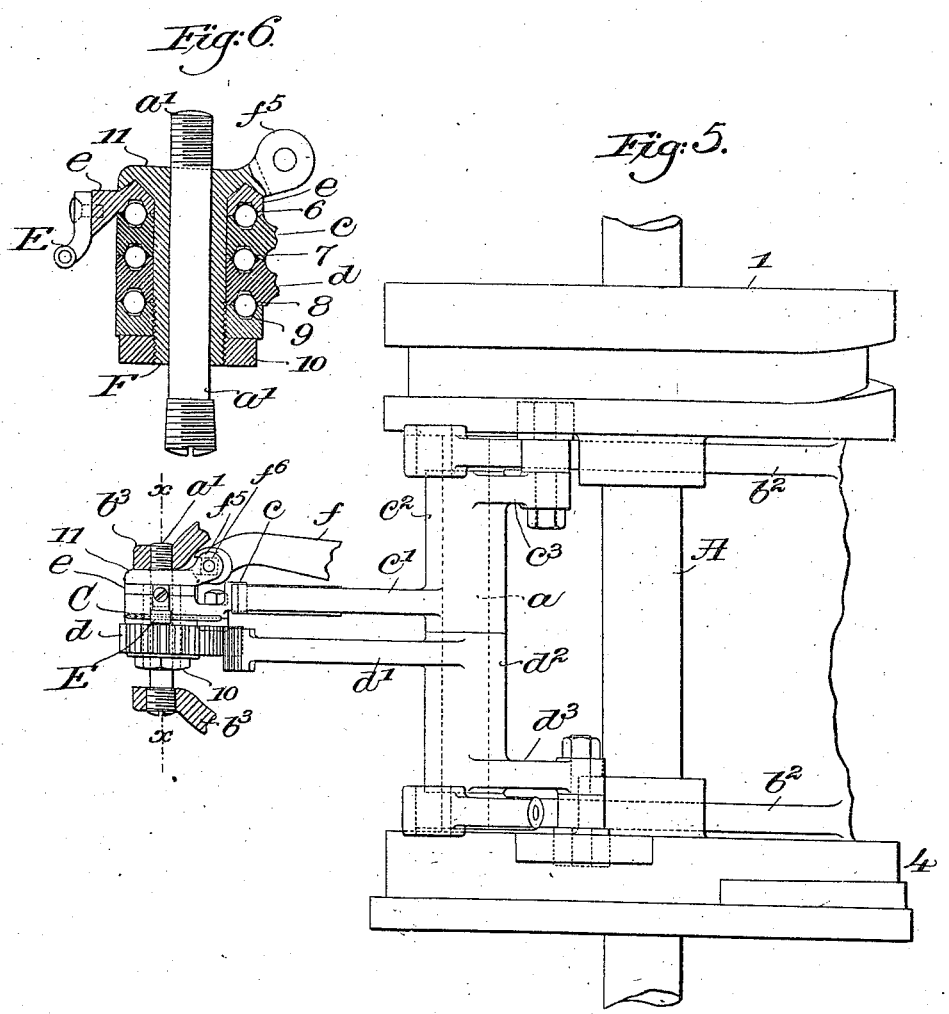

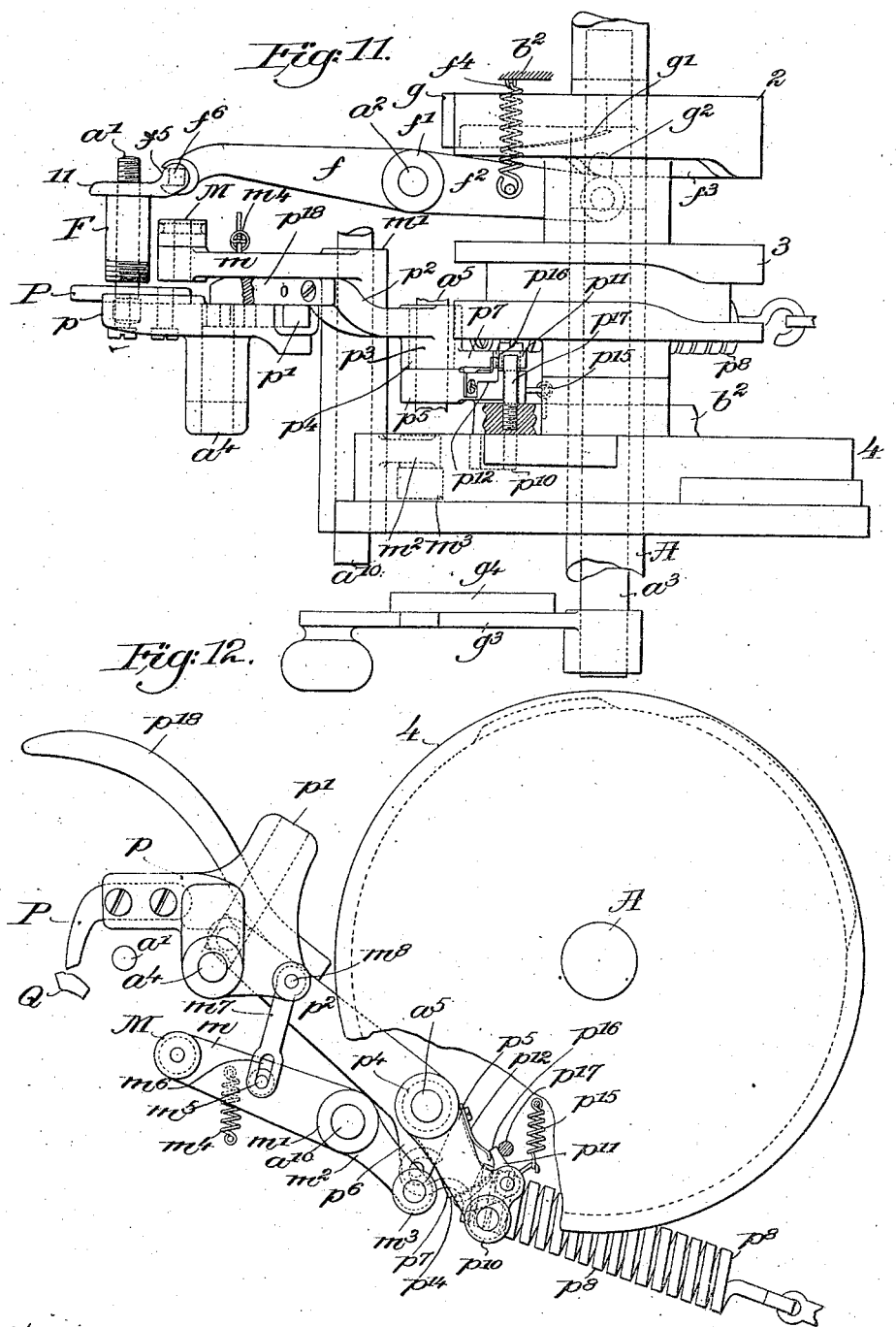

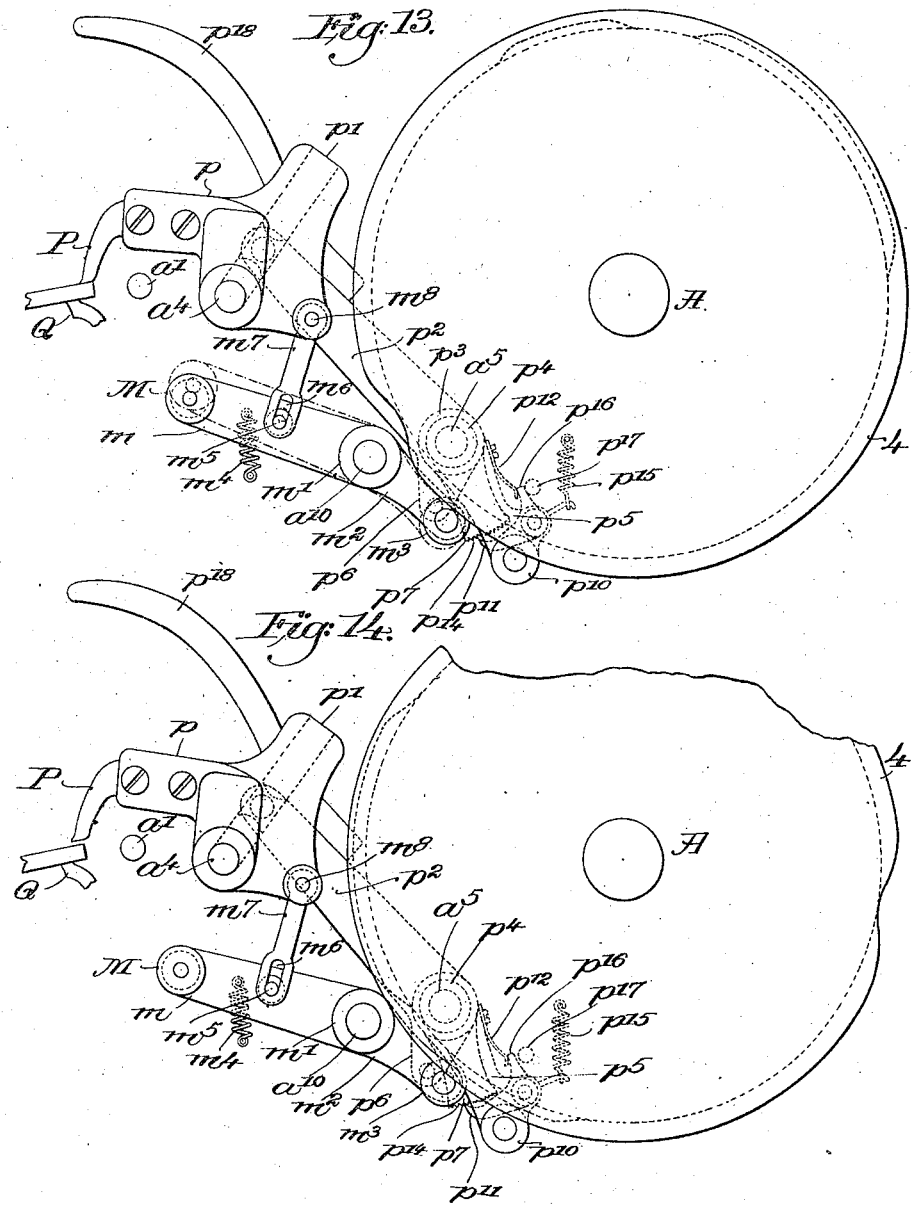

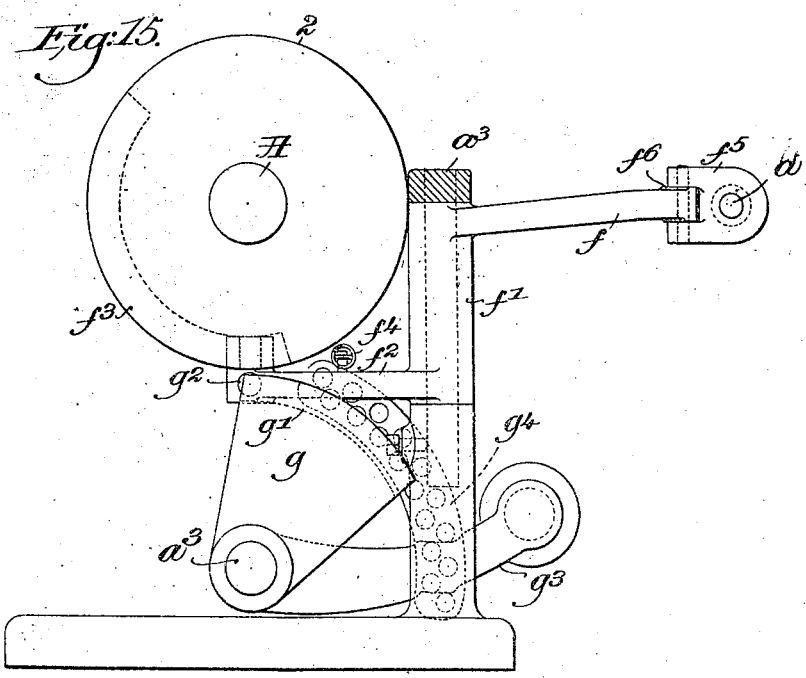

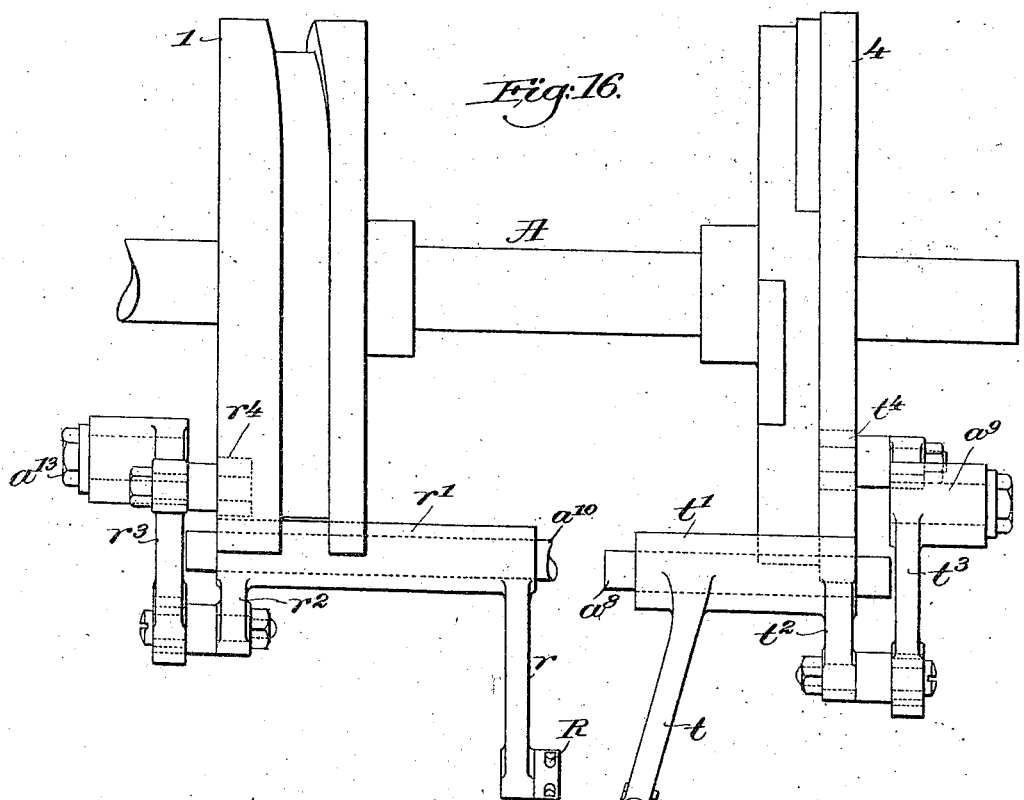
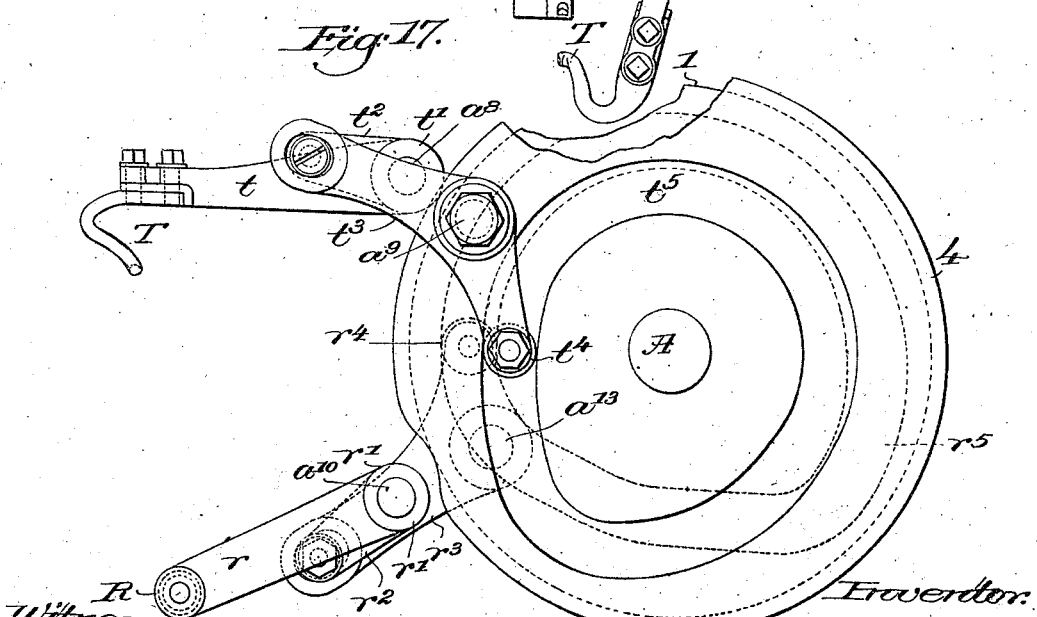

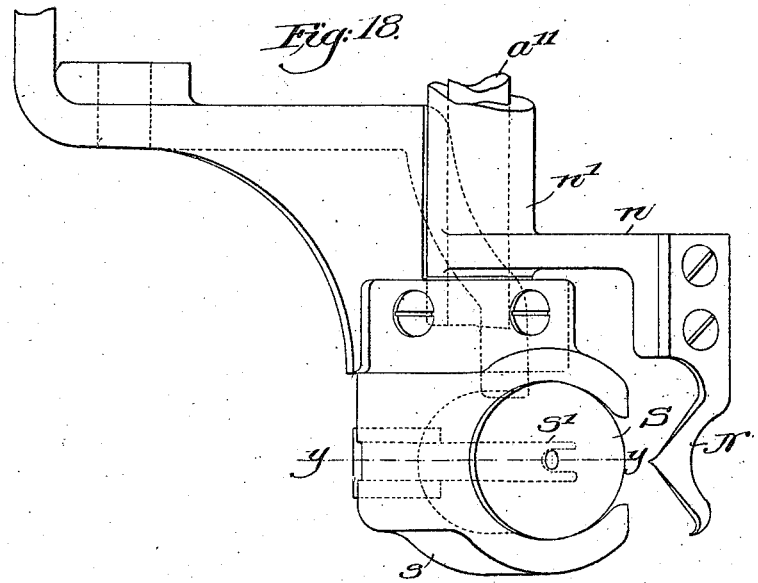
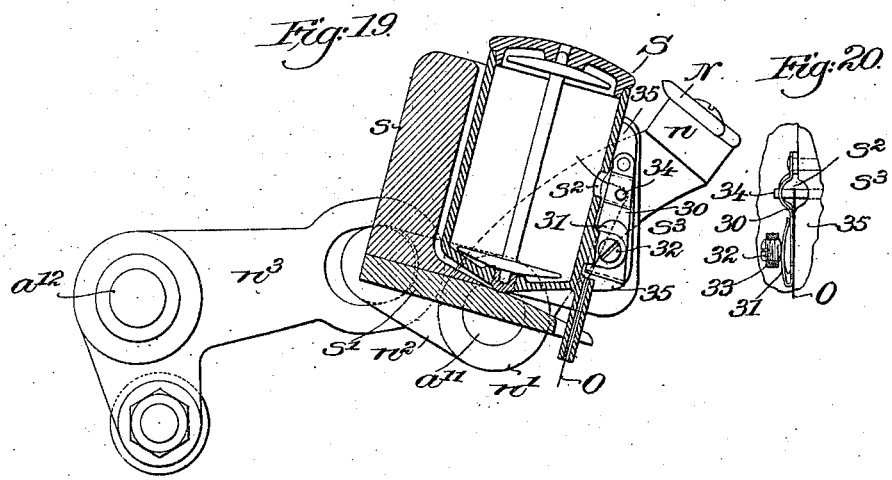

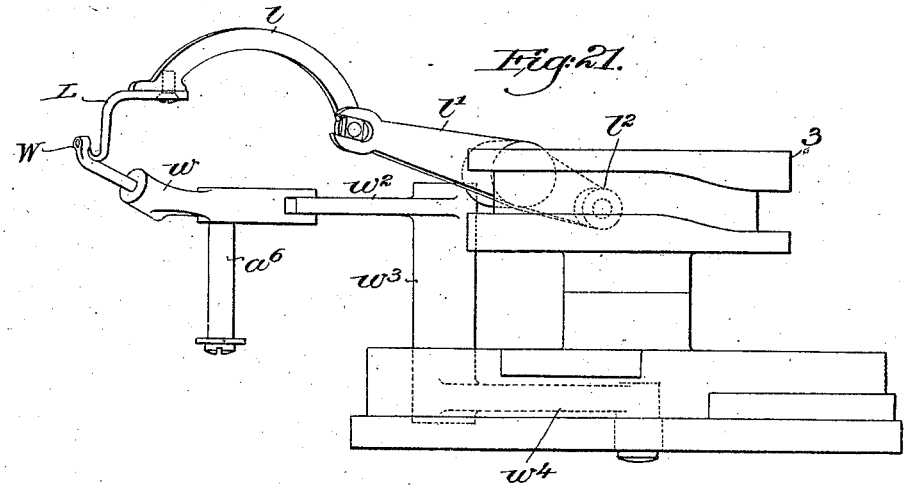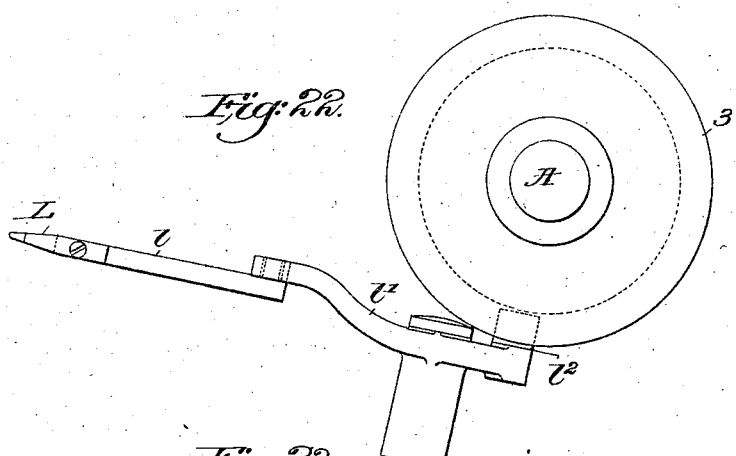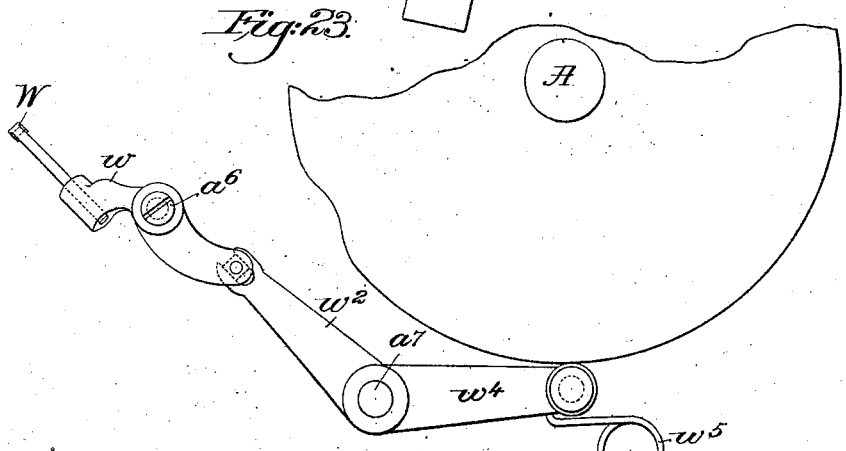

UNITED STATES PATENT OFFICE.

MARSHALL HENRY PEARSON, OF LEICESTER, ENGLAND, ASSIGNOR TO UNITED SHOE MACHINERY COMPANY, OF PATERSON, NEW JERSEY, A CORPORATION OF NEW JERSEY.

SHOE-SEWING MACHINE.

1,001,980.  Specification of Letters Patent.  Patented Aug. 29, 1911.

Application filed July 23, 1900. Serial No. 24,548.

*To all whom it may concern:*

Be it known that I, MARSHALL HENRY PEARSON, a subject of the Queen of Great Britain and Ireland, residing at Leicester, in the county of Leicester, England, have invented certain new and useful Improvements in Shoe-Sewing Machines; and I do hereby declare the following to be a full, clear, and exact description of the invention, such as will enable others skilled in the art to which it appertains to make and use the same.

The present invention relates generally to shoe sewing machines, and more particularly to shoe sewing machines of the lock stitch type such as are commonly used to stitch the outsole to the welt in welted work, and to some extent for inseaming in both welted and turned work.

The object of the present invention is to improve the construction, organization, and mode of operation of machines of this class and to this end it consists of a shoe sewing machine having in combination with such other mechanism as may be required to construct an operative machine of this class, the construction and arrangement of which may be varied to meet special requirements and at the option of the designer, of certain novel features which coöperate with such mechanism to secure a more perfect operation of the machine as a whole as hereinafter more fully described in this specification and pointed out in the claims.

A preferred form of the present invention is illustrated in the accompanying drawings, in which, Figure 1 is a plan view of a shoe sewing machine embodying the same, Fig. 2 is a side elevation taken in the direction of the arrow, Fig. 1, the driving pulley being omitted, Fig. 3 is a side elevation taken in a reverse direction, the thread holder and a portion of its actuating mechanism being omitted, Fig. 4 is a side elevation of the needle and awl actuating mechanism, Fig. 5 shows the same parts in plan, Fig. 6 is a sectional detail of the awl and needle segments taken on line $x-x$ Fig. 5, Fig. 7 is a front view of the needle and awl, and a portion of their actuating mechanism, Fig. 8 is a sectional view showing needle guide, needle, and its segment in side elevation, Figs. 9 and 10 are respectively side and front elevations illustrating the thread clamp and thread waxing devices, Fig. 11 is a plan view showing the lifting mechanism for the presser foot, the thread measurer and its actuating mechanism, and the feed mechanism, Fig. 12 is a side elevation of the presser foot and its lifting mechanism, Figs. 13 and 14 are corresponding views of the same parts in different positions, Fig. 15 is a side view showing a portion of the feeding mechanism, Fig. 16 is a plan view of the thread lifter, take-up, and their actuating mechanisms, Fig. 17 shows the same parts in side elevation, Fig. 18 is a plan view of the thread holder and a portion of its actuating mechanism, Fig. 19 is a section through the thread holder at $y-y$ Fig. 12, Fig. 20 is a detail of the thread holder tension, Figs. 21, 22 and 23 illustrate the looper, thread-eye, and portions of their actuating mechanism.

In the drawings B represents a frame suitable to support the working parts of the machine. Frame B has a base $b$ which may be mounted upon the usual supporting column. It is also provided with the standards $b'$, $b'$, as is usual in the construction of this class of machine. In the standards $b'$, $b'$, are the bearings for the driving shaft A. The frame B also comprises certain brackets and other rigid members which are necessary to properly support the working parts of the machine and which will be hereinafter referred to in so far as is necessary to enable any person skilled in the art to construct the machine.

C represents the needle which is mounted in a needle segment $c$. The needle segment $c$ is mounted to turn loosely on the feed sleeve, hereinafter to be described, and carries a segmental pinion, preferably made integral therewith mating with a segmental gear carried by the lever $c'$ which is projected from a hub or sleeve $c^2$, mounted to turn on a shaft $a$ supported by the standards $b^2$, $b^2$, forming part of the frame B. Projected from the hub or sleeve $c^2$, is an arm $c^3$ which carries a cam roll engaging the cam groove $c^4$ (see dotted line Fig. 4) in the inner face of the cam disk 1.

D represents the awl, which is secured in the awl segment $d$, mounted to turn loosely on the feed sleeve and upon which is formed a segmental pinion mating with a gear on the lever $d'$, which is projected from a hub or sleeve $d^2$, mounted upon the shaft $a$ said hub or sleeve $d^2$ having an arm $d^3$, which carries a cam roll, engaging the cam groove $d^4$, in the inner face of disk 4 (see dotted lines Fig. 4).

E represents the needle guide which is secured to an annular support $e$, which is also mounted on the feed sleeve and which is actuated to keep the needle guide in proper relation to the needle by means of the tappet pin $c^5$ on the needle segment, which engages the shoulder $e'$ on the annular support $e$ and by the upper end $c^6$ of the needle segment $c$, which forms a tappet and engages the guide E. The difference in friction between the plain bearing on one side and the ball bearings on the other side of said support being sufficient to hold the needle guide in position until acted upon by the tappets.

The annular support $e$, the hub of the needle segment $c$, and the hub of the awl segment $d$, as shown in the drawings (Fig. 6) bear laterally against each other, and in their contiguous faces are formed grooves which register with each other to form the ball races 6, 7 and 8 in each of which run a series of balls in the usual manner. The bearings just described may be conveniently adjusted by means of the cone 9, having threaded bearings on the feed sleeve, a locknut 10 being conveniently provided.

By the novel features heretofore described, in the arrangement of the awl, needle and needle guide and the construction and arrangement of the bearings and actuating mechanism therefor, I am enabled to maintain these parts in their proper alinement and the same time secure an easy operation thereof without the development of excessive friction, and without undue wear of said parts, which is an important feature in this class of machines.

F represents the feed sleeve, which is mounted and free to slide upon a short shaft $a'$, supported by the brackets $b^3$ forming a part of the frame B. The shaft $a'$ is of sufficient length and the brackets $b^3$ are located a sufficient distance apart to allow sufficient longitudinal movement of the sleeve F to secure any required length of feed. The sleeve F is provided with an annular flange 11 (Fig. 6) which coöperates with the cone 9 and check nut 10 to hold in position the annular support $e$ of the needle guide, the needle segment $c$ and the awl segment $d$ and to cause them to be moved laterally by the longitudinal movement of the feed slide.

As shown in the drawings the longitudinal movement of the sleeve F is imparted thereto by means of a lever $f$, projected from a hub $f'$, which is mounted to turn on a short vertical shaft $a^2$, supported by the frame B. The hub $f'$ has an arm $f^2$ which carries a cam roll which engages the cam $f^3$ on the inner face of the disk 2. A suitable spring is provided conveniently the coiled spring $f^4$ connected to the arm $f^2$ and to the bracket $b^2$ which acts to hold the cam roll on arm $f^2$ against the cam $f^3$. The front end of the lever $f$ is connected with a lug $f^5$ on the sleeve F by a pivotal and sliding connection as $f^6$. The above described arrangement is such that a rotation of disk 2, by means of the arm $f^2$, hub $f'$ and lever $f$, imparts a longitudinal reciprocating movement to the slide F and a laterally reciprocating movement to the needle and awl segments and needle and awl carried thereby. Provision is made in the mechanism hereinbefore described for actuating the needle and awl for their lateral movement by making the segmental gear on the awl actuating lever $d'$ (Fig. 5) wider than the awl segment $d$ (the segmental gear on needle lever $c'$ requiring little if any widening) and the awl and needle mechanism is so timed that the sleeve F is moved in the direction of the feed while the awl is in the work and in a reverse direction while both awl and needle are out of the work.

It will be noted that the awl D and needle C are set off from the plane of the centers of their respective segments (see Fig. 7) so that they work in the same vertical plane and with reference to the movement of the feed sleeve and of each other they operate as follows:—The awl pierces the material while the feed sleeve is in its retracted position (to the right Fig. 1), the needle then being out of the material in its retracted position, the feed sleeve then moves over to its advance position, the awl carrying along the material and thus accomplishing the feed. The awl then withdraws from the material and the needle enters the hole made thereby. The needle then withdraws from the material, the awl remaining out of the same and the feed sleeve moves back to its retracted position while both needle and awl are thus withdrawn from the material.

In boot and shoe work it is often necessary to vary the length of the feed and to accomplish this result while the machine is in operation, and to this end in the machine of the drawings I have provided the following mechanism. Supported in suitable bearings in the frame B in which it is free to turn, is a shaft $a^3$, to which is rigidly secured a segment $g$ located below the disk 2. On the inner face of the segment $g$ is formed a cam $g'$ which is arranged to be engaged by a lug or projection $g^2$ on the arm $f^2$ and to limit the movement of the arm $f^2$ toward the disk 2 as caused by the spring $f^4$, by thus limiting the movement of the arm $f^2$ the cam $g'$ limits the movement of lever $f$ and feed sleeve F and hence the length of the feed. By turning the segment $g$ the position of cam $g'$ may be varied so that the lug $g^2$ will contact earlier or later therewith varying the extent of the swinging movement of arm $f^2$ and thus securing any required length of feed. The shaft $a^3$ carries in convenient position for the operator a hand lever $g^3$, which may be conveniently arranged to move along a segment plate $g^4$ in which are provided a series of pin holes to receive suitable stop pins (not shown) which limit the movement of the lever $g^3$. By properly placing these stop pins the operator can readily make the necessary changes in feed required in boot and shoe work while the machine is in operation.

By the improved construction and arrangement of the feed mechanism hereinbefore described I am enabled to reduce the weight of the operating parts, and thereby secure a quick and light running feed which is effective and durable, which is a very desirable feature where a machine is to be run at high speed as is usual in boot and shoe work. I also secure a simple, certain and durable means for adjusting the length of feed during the operation of the machine.

P represents the presser foot which coöperates with the work support Q to clamp the work. The presser foot P is forced down by a spring to perform its clamping function and is raised to remove its pressure from the work to permit the feeding movement of the work. As shown the presser foot P is secured to the bent lever $p$ which is fulcrumed upon a stud $a^4$, supported by the bracket $b^2$ of frame B. In the lever $p$ is formed an inclined groove $p'$ in which runs a slide block carried by the lever $p^2$, the arrangement being such that when the lever $p^2$ is depressed the slide block carried thereby is moved along the groove $p'$ toward the fulcrum of lever $p$, forcing the lever $p$ forward and bringing the presser foot P down on to the work. When the lever $p^2$ is raised the slide block is moved along the groove $p'$ away from the fulcrum of lever $p$ and the lever $p$ is swung back and the presser foot P raised.

The lever $p^2$ has a hub $p^3$ which is free to turn about the shaft $a^5$, secured to the bracket $b^2$. The hub $p^3$ is not mounted directly on the shaft $a^5$, but fitted over the hub $p^4$ of the lever $p^5$ hereinafter referred to. The hub $p^3$, which carries the lever $p^2$, also carries the rigidly projected arms $p^6$ and $p^7$, the arm $p^6$ being acted upon by a spring to depress the lever $p^2$ and hold the presser foot P down on the work and the arm $p^7$ being connected with the presser foot raising mechanism and acting through the lever $p^2$ to raise the presser foot against the tension of said spring. As shown, a coiled spring $p^8$ is provided, which is connected at one end to the arm $p^6$ and at the other to some fixed portion of the machine. The spring $p^8$ is always under tension and normally acts to depress the lever $p^2$ and hold the presser foot P down on the work. Means for adjusting the tension of the spring $p^8$ may be provided, conveniently the thumb screw $p^9$.

The foot P is raised to permit the feed of the work by the following mechanism:— Mounted on the shaft $a^5$ and free to turn thereon is the lever $p^5$, hereinbefore referred to, which carries a cam roll $p^{10}$ which engages a suitably shaped periphery cam on disk 4. A spring $p^{15}$ is provided which acts to hold the cam roll $p^{10}$ against the cam. The lever $p^5$ carries a spring pressed pawl $p^{11}$ the controlling spring $p^{12}$ of which acts when the pawl is free to bring it into engagement with the ratchet $p^{14}$ on the lever $p^7$. The pawl $p^{11}$ has a projecting lug $p^{16}$ which is arranged to engage a pin $p^{17}$, secured in the frame of the machine, such engagement taking place when the lever $p^5$ is in its highest position, and preventing the engagement of the pawl $p^{11}$ with the ratchet $p^{14}$. When the lever $p^5$ is depressed by the action of the cam on disk 4, the lug $p^{16}$ leaves the pin $p^{17}$ and allows the pawl $p^{11}$ to engage the ratchet $p^{14}$, and any further depression of the lever $p^5$ will depress the lever $p^7$ and thereby raise the lever $p^2$ and the presser-foot P.

A handle $p^{18}$ is provided by means of which the presser foot P may be raised to insert the work.

It will be noted in connection with the foregoing description of the presser foot, and its controlling mechanism that in the machine of the drawings, the presser foot can always be raised by the handle $p^{18}$, but cannot be raised by any pressure liable to be exerted under the foot, and further, while work is being fed the foot is raised to the same height above the work under varying conditions as to the thickness thereof. It is also to be noted that by my improved construction, greater pressure is obtained and the work more firmly held than by the devices of the prior art, all of which features I regard as important in this art.

In the machine of the drawings the needle has its hook or barb on the outside and the looping instrumentalities consist of a thread eye and looper which coöperate with each other to draw the needle thread across the path of motion of the needle and in contact with the needle on the outside, so that, as the needle is retracted from the material, its hook catches the thread and draws a loop thereof through the material.

In the drawings W represents the thread eye which is secured to a bent lever $w$ which is rigidly secured to a short shaft $a^6$ having bearings in the frame in which it is free to turn. The lever $w$ is connected by a suitable pivotal sliding connection, conveniently the usual form of slot and block connection, with one arm $w^2$ of the bent lever $w^3$ fulcrumed on a short shaft $a^7$ supported by the frame B, the other arm $w^4$ of said lever carrying a cam roll which engages the periphery cam on the disk 4. A suitable spring $w^5$ is provided to keep the roll in engagement with the cam. The above described arrangement is such that a rotation of the cam imparts a vertically oscillating movement to the thread eye W.

L represents the looper and is mounted upon an oscillating segment $l$ which is mounted in a guide way in the frame B (see dotted lines Fig. 1). The lever $l$ is actuated by means of the swinging lever $l'$ which is connected to the segment $l$ by suitable pivotal sliding connection and at the other end carries a cam roll $l^2$ which engages a suitably shaped cam on the disk 3. Intermediate its ends, the lever $l'$ is fulcrumed on a fixed stud on the frame B.

The operation of the devices above described will be best understood by considering it in relation to the operation of the needle. Assuming the needle to be in its retracted position the hook of the looper and the thread eye are substantially in line, the hook of the looper engaging the thread between the thread eye and the work. Before the needle descends, the looper is moved by an oscillation of its segment across the plane of motion of the needle, and a portion of the needle thread is held substantially horizontal leading across the plane of motion of the needle and outside of its path of motion. The needle then descends and penetrates the material and the thread eye is moved inward, moving the needle thread against the needle so that, when the needle rises, the thread is caught in the hook thereof. By the improved arrangement of the looper hereinbefore described I am enabled to give it the required movement to effect with certainty the insertion of the loop of thread into the hook of the needle, and at the same time leave the center of the machine free from obstructing parts.

In the machine of the drawings the thread holder is of the stationary elongated type as distinguished from the discoidal shuttle commonly used in this class of machine. The thread holder is shown at S and is circular in section, and of general cylindrical form. The thread holder is loosely held in a casing $s$ which substantially surrounds it, the thread holder resting upon a bar $s'$ which extends across the bottom of the casing. The thread holder S is provided with a downwardly extending thread nose through which the thread leads from the bobbin and which is engaged by the bifurcated end of the bar $s'$ (see Fig. 19), to prevent any rotation of the thread holder. It will be noted, as shown in the drawing, that the elongated thread holder S is supported in an oblique position with relation to the plane of motion of the needle. This arrangement greatly facilitates the passage of the thread around the thread holder including both the delivery of the loop to, and the clearance of the loop from the thread holder. Inside the thread holder is a bobbin of the type usual in thread holders of this class. The thread leads from the bobbin through the eye $s^2$, then through a tension device $s^3$ and through the thread nose of the thread holder. As shown the tension device $s^3$ consists of a spring plate 30, having an upturned portion 31, which bears against the regulating screw 32 having threaded bearings 33 in a projection from the thread holder. By turning the screw 32 the pressure of the plate 30 on the thread may be regulated. The thread leads from the opening $s^2$ in the thread holder around a pin 34 set in a projection 35 from the thread holder and thence between said projection and the plate 30 to the nose of the thread holder.

In the machine of the drawings, the thread is taken from the needle by the thread lifter, from which it is taken by the thread holder hook and passed over the thread-holder. In the machine of the drawings T represents the thread lifter which is carried by a lever $t$ projected from the hub $t'$ mounted on a short shaft $a^8$ supported by the frame B. Projected from the same hub $t'$ is the short lever $t^2$ connected by suitable pivotal sliding connections, conveniently by the roll and slot as shown, with the bent lever $t^3$ mounted upon and free to turn about the stud $a^9$ supported by the frame B. At the other end of lever $t^3$ is mounted the cam roll $t^4$ which engages a suitably formed cam groove $t^5$, on the outer face of the cam disk 4. By the above arrangement a rotation of the cam will impart a vertically oscillating movement to the thread lifter T.

N represents the thread holder hook, which, as before stated, takes the thread from the thread lifter and passes it around the thread holder, leaving it in such position that the take-up can draw it under the thread holder. The thread-holder hook N is mounted on an arm $n$ projected from the hub $n'$ mounted to turn on a short shaft $a^{11}$ which is secured in the frame B. The hub $n'$ carries another arm $n^2$ (see Figs. 1 and 19) which is connected by a sliding pivotal connection, conveniently a roll and slot connection, with a bent lever $n^3$, fulcrumed upon a short shaft or stud $a^{12}$ secured in the frame B. The other arm of the lever $n^3$ carries a cam roll which engages with the face cam in the disk 1. The movement of the thread holder hook is so timed with the movement of the thread lifter that after the lifter has taken the loop of thread from the needle and raised it toward the thread holder, it is taken by the thread holder hook and carried over the thread holder into such position that when the take-up acts, it can pull the loop around the thread holder and bring it into position in the material.

My improved thread holder, as compared with shuttles of the stationary type in the prior art, has an increased thread carrying capacity in proportion to the length of the loop required to be drawn around it, and the passage of the thread over the thread holder is more readily and easily effected and there is less liability of the loop of thread being caught in any portion of the thread holder mechanism. As compared with the several types of movable shuttles, my improved thread holder absorbs less power and creates less vibration. It also requires no oiling of parts liable to come in contact with the thread.

It is to be understood that while a peculiar form of thread holder has been described and shown it is not intended by the use of the term "thread holder" to limit the claims to any particular form of thread holder, since other forms may be used in the combinations defined thereby without departure from the invention.

After the loop of thread has been passed around the thread holder, it is pulled down through the work to complete the stitch by the take-up. In the machine of the drawings the take-up is of the vertically oscillating type common to this class of machines and engages the thread between the thread measurer and the work.

R represents the take-up roll mounted upon the lever $r$, projected from the hub $r'$ which is free to turn upon the shaft $a^{10}$ mounted in the frame B. A short lever $r^2$ projected from the hub $r'$ is connected by suitable pivotal sliding connections conveniently the roll and slot as shown with one arm of the bent lever $r^3$, which is free to turn about the stud $a^{13}$ mounted in the frame of the machine. A cam roll $r^4$ secured to the other arm of lever $r^3$ engages a suitably shaped cam groove $r^5$ in the outer face of the disk 1. The arrangement of the parts is such that a rotation of the cam will impart a vertically oscillating movement to the take-up R properly timed with relation to the other stitch forming movements.

Another feature of the present invention is the thread measurer, which gives up thread in varying quantities while the take-up is pulling in the stitch and while the thread is locked at the supply side, thus determining the position of the bight of thread, commonly called the lock, in the material, and which, when the take-up has finished its thread-pulling stroke, and while the thread is unlocked at the supply side, acts to draw thread from the supply for the next stitch. In the machine of the drawings the thread measurer is shown at M, and is mounted on a lever $m$ which is projected from a hub $m'$ free to turn on the shaft or stud $a^{10}$ supported by the frame B. From the hub $m'$ is projected a lever $m^2$ which carries a cam roll $m^3$ which bears against a periphery cam on the disk 4. The cam roll $m^3$ is held in engagement with its cam by a suitably placed spring conveniently the coiled spring $m^4$ secured at one end to the lever $m$ and at the other to a stationary part of the machine. From the lever $m$ is projected a pin $m^5$ which engages a slot $m^6$ in a link $m^7$ pivoted at $m^8$ to the bent lever $p$ which carries the presser foot P. As heretofore fully described, the bent lever $p$ is raised or lowered in accordance with the thickness of the stock and the above described arrangement is such that by the action of the cam on the roll $m^3$ the thread measurer M is always raised to the same height, but since the point to which it can be depressed by the action of the spring $m^4$ is determined by the bottom of the slot $m^6$, the position of which is determined by the position of the lever $p$, the thread measurer M is not brought to the same position by its downward movement but to varying positions dependent upon the thickness of the stock. The downward movement of the thread measurer M is its delivery or thread-giving movement, whereby it gives up thread to the take-up during its thread pulling stroke. It therefore follows that the amount of thread given to the take-up by the thread measurer will vary in accordance with the thickness of the stock, and since all the thread-pulling movement of the take-up, not required to take up the loop which has been drawn around the thread holder and the stock and which is given to it by the thread measurer, is available to draw the bight into the material, and since the length of the thread holder loop is constant, it follows that the amount of thread given up by the thread measurer determines the position of the lock.

To secure the operation of the thread measurer as above described, I have provided a suitable thread lock whereby the thread is intermittently locked between the thread measurer and the supply to prevent it being drawn from the supply. As shown in the drawings the thread lock consists of a fixed jaw K secured to a bracket $k$ projected from the frame B, and a movable jaw $K'$ eccentrically pivoted on a hub $k'$ from which is projected a lever $k^2$ having a pivotal and sliding connection, conveniently a roll and slot connection, with a lever $k^3$ projected from a hub $k^4$ free to turn on the stud $a^{18}$ supported by the frame B. (See Figs. 9 and 10). Projected from the hub $k^4$ is the lever $k^5$ which carries a cam roll $k^6$ which engages a periphery cam on the disk l. A spring $k^5$ is provided which holds the cam roll in engagement with the cam. The thread leads between the jaws K and K' through the wax tube to the thread measurer M. The cam is so formed and timed that the jaws K and K' remain open during the upward movement of the thread measurer M so that thread can be drawn freely from the supply, and close just before the take-up starts on its downward or thread pulling movement and remain closed during such movement and during the downward movement of the thread measurer which delivers thread to the take-up.

While no special form of waxing device is essential to the successful operation of my invention as heretofore described, I have shown in the drawings an improved waxing device which I consider a useful adjunct of the present invention and as contributing to the successful operation of the machine embodying the same. As shown in the drawings, the waxing device consists of a main receptacle or reservoir H in which the cool wax is placed. This reservoir communicates through a port $h$ with a wax tube $h'$, conveniently arranged in a vertical position and in line with the lead of the thread from the jaws K, K' to the thread measurer M. The wax tube $h'$ is provided at the top and bottom with the strippers $h^2$, $h^2$ which may be of any usual and convenient construction. The upper stripper is for the purpose of preventing too much wax being drawn out of the tube by the thread, and the lower stripper is to prevent the escape of wax through the aperture which admits the thread to the tube. The tube $h'$ is conveniently formed in a metal block $h^3$ that forms a part of the bracket $k$ and in which is formed another tube or chamber $h^4$ into which steam is introduced through a pipe $h^5$, said steam emerging through the pipe $h^6$. By this means the block $h^3$ is heated and the wax kept at proper temperature for application to the thread.

The operation of these several features of my invention as illustrated in the drawings has already been described in connection with the description of their construction and arrangement. It is therefore necessary to give only a brief description of the machine of the drawings as a whole.

Assuming that a stitch has just been completed, the awl and needle being at this time both retracted from the work, and the work held by the pressure of the presser foot, the awl first penetrates the work, the presser foot then lifts, releasing its pressure on the work, and the awl is moved laterally to accomplish the feed. As soon as the work has been fed, the presser foot drops and again grips the work, and the looper pulls the thread across the path of the needle. The needle penetrates the material (the awl withdrawing at the same time), and the thread eye carries the thread into the hook of the needle. The needle then withdraws and pulls a loop of thread into the work, the looper at the same time returning and releasing the thread. When the needle has reached its retracted position, the thread lifter takes the loop of thread therefrom and raises it toward the top of the thread holder and into position to be taken by the thread holder hook which takes it over the thread-holder and the take-up then tightens the stitch.

I have not illustrated in detail in the drawings the several cams herein referred to, for the reason that from the foregoing description of the construction, mode of operation and timing of the machine, such cams can readily be made by one of average skill in the art without the exercise of invention, such construction requiring only the usual skill of a sewing machine designer.

Having thus described my invention, I claim as novel and desire to secure by Letters Patent of the United States:

1. A lock stitch shoe sewing machine, having, in combination, stitch forming mechanism comprising a needle, a stationary thread holder, means for supporting the thread-holder, a thread lifter for taking the loop of thread from the needle, and a thread holder hook for taking the thread from the thread lifter, substantially as described.

2. A lock stitch shoe sewing machine, having, in combination, stitch forming mechanism comprising a stationary elongated thread holder inclined to the plane of motion of the needle, means for supporting the thread holder, and a thread lifter, thread hook and take-up coöperating to pass a loop of thread around the thread holder, substantially as described.

3. A lock stitch shoe sewing machine, having, in combination, stitch forming mechanism comprising a curved needle, and needle segment, a needle guide, an annular support therefor movable about an axis common to the needle segment, a collar for holding the annular support in position, ball bearings between the annular support and needle segment, a frictional bearing between the annular support and the collar, and tappets on the needle segment for actuating the annular support, substantially as described.

4. A lock stitch shoe sewing machine, having, in combination, stitch forming mechanism, comprising a curved needle, a needle segment, a needle guide, an annular support therefor movable about the axis of the needle segment and normally held from oscillation with the needle segment by the difference in frictional resistance on its opposite sides, and means connected with the needle segment for oscillating said annular support, substantially as described.

5. A lock stitch shoe sewing machine, having, in combination, stitch forming mechanism comprising a take-up, a presser foot, a thread measurer, means for imparting to the thread measurer a thread pulling stroke, means for imparting thereto a thread delivery stroke, and mechanism connected with the presser foot for determining the extent of the thread delivery stroke of the thread measurer to regulate the amount of slack thread given thereby to the take-up, substantially as described.

6. A lock stitch shoe sewing machine, having, in combination, stitch forming mechanism comprising a take-up, a thread measurer, a work support, a presser foot, a lever for actuating the thread measurer, a slotted link connecting the presser foot with the lever for actuating the thread measurer, whereby the stroke of said lever is regulated, substantially as described.

7. A lock stitch shoe sewing machine, having, in combination, an oscillating curved hooked needle, a looper, a take-up, a stationary elongated thread holder on the same side of the work as the needle and inclined to the plane of motion of the needle, means for supporting the thread holder and means for carrying the needle thread over the thread holder, substantially as described.

8. A lock stitch shoe sewing machine, having, in combination, an oscillating curved hooked needle, a looper, a take-up, a stationary elongated thread holder on the same side of the work as the needle and inclined to the plane of motion of the needle provided with a nose depending from the side of the thread holder adjacent to the needle, a support for the thread holder, provided with a bifurcated end to embrace the nose of the thread holder and hold the same from rotation and means for carrying the needle thread over the thread holder, substantially as described.

9. A lock stitch shoe sewing machine, having, in combination, an oscillating curved hooked needle, a looper, a take-up, a stationary elongated thread holder on the same side of the work as the needle and inclined to the plane of motion of the needle, a support for the thread holder consisting of the casing loosely embracing the sides of the thread holder and a bar extended across the bottom of the casing and means for carrying the needle thread over the thread holder, substantially as described.

10. A lock stitch shoe sewing machine, having, in combination, an oscillating curved hooked needle, a looper, a take-up, a stationary elongated thread holder, a thread lifter oscillating in the plane of motion of the needle for taking the loop of thread from the needle, and a thread hook oscillating in a plane at right angles to the plane of motion of the needle for taking the thread from the lifter and carrying it over the thread holder, substantially as described.

11. A lock stitch shoe sewing machine, having, in combination, stitch forming mechanism comprising a take-up, a presser foot, a thread measurer, feed mechanism, a work support, a presser foot carrying lever, a presser foot actuating lever, means for imparting equal oscillations to the presser foot actuating lever independent of the position of the presser foot, a cam for imparting to the thread measurer a thread pulling stroke, a spring for imparting thereto a thread delivery stroke, a connecting device between the presser foot carrying lever and the thread measurer acting to limit the thread delivery stroke of the thread measurer according to the thickness of the work, substantially as described.

12. A lock-stitch shoe sewing machine, having, in combination, an oscillating curved hooked needle penetrating the work from above, a looper, a take-up, a stationary elongated thread holder on the same side of the work as the needle and inclined to the plane of the needle, means for carrying the needle thread over the thread holder, and an open casing substantially surrounding the thread holder and loosely holding it in operative position, substantially as described.

13. A lock-stitch shoe sewing machine, having, in combination, an oscillating curved hooked needle, a needle segment, an oscillating curved awl, an independent awl segment, means for supporting the needle segment and awl segment so that the needle and awl always remain in the same plane with each other, means for oscillating the needle segment and awl segment, means for reciprocating the needle and awl segment in a line at right angles to the plane of the needle and awl, a looper, a take-up, a stationary thread holder on the same side of the work as the needle and means for carrying the needle thread over the thread holder, substantially as described.

14. A lock-stitch shoe sewing machine, having, in combination, an oscillating curved hooked needle, an oscillating curved awl penetrating the work from the opposite side to the needle, a needle segment, an independent awl segment, means for supporting the needle segment and awl segment so that the needle and awl always remain in the same plane with each other, a looper, a take-up, a thread holder on the same side of the work as the needle, means for carrying the needle thread over the thread holder and means for actuating the parts, substantially as described.

15. A lock-stitch shoe sewing machine, having, in combination, an oscillating curved hooked needle, an oscillating curved awl penetrating the work from the side opposite to the needle, a needle segment, an independent awl segment, means for supporting the needle segment and awl segment so that the needle and awl always remain in the same plane with each other, means for moving the supporting means for the needle and awl segments while the awl is in the work to feed the work, a looper, a take-up, a stationary elongated thread holder on the same side of the work as the needle and inclined to the plane of the needle, means for carrying the needle thread over the thread holder, and means for actuating the parts, substantially as described.

16. A lock-stitch shoe sewing machine, having, in combination, an oscillating curved hooked needle, an oscillating curved awl, a needle segment, an independent awl segment, means for supporting the needle and awl segments so that the needle and awl always remain in the same plane with each other, a looper, a take-up, a stationary elongated thread holder mounted on the same side of the work as the needle and inclined to the plane of the needle, means for carrying the needle thread over the thread holder, and means for actuating the parts, substantially as described.

17. A lock-stitch shoe sewing machine, having, in combination, a curved hooked needle, a curved awl located and operating always in the plane of the needle, a looper, a stationary elongated thread holder on the same side of the work as the needle and inclined to the plane of the needle, means for carrying the needle thread over the thread holder, a take-up and means for actuating the parts, substantially as described.

18. A lock-stitch shoe sewing machine, having, in combination, a curved hooked needle, a looper, a curved awl located and operating always in the plane of the needle, a stationary elongated thread holder on the same side of the work as the needle having its axis inclined to the plane of the needle and lying in a plane at right angles to the plane of the needle, a looper, a take-up, and means for carrying the needle thread over the shuttle holder, and means for actuating the parts, substantially as described.

19. A lock-stitch shoe sewing machine, having, in combination, a curved hooked needle, a looper, a stationary elongated thread holder on the same side of the work as the needle, having its axis inclined to the plane of the needle and lying in a plane at right angles to the plane of the needle, means for carrying the needle thread over the thread holder, a take-up, and means for actuating the parts, substantially as described.

20. A lock-stitch shoe sewing machine, having, in combination, a curved hooked needle, a looper, a curved awl acting to feed the work, a stationary elongated thread holder having its axis inclined to the plane of the needle, and lying in a plane at right angles to the plane of the needle, means for carrying the needle thread over the thread holder, a take-up and means for actuating the parts, substantially as described.

21. A lock stitch shoe sewing machine, having, in combination, a hooked needle, a looper, a take-up, a stationary thread holder on the same side of the work as the needle, an open casing constituting the sole, means for holding the thread holder in operative position, an oscillating thread lifter for spreading the needle loop, and an oscillating thread-holder hook for carrying the loop over the thread holder, substantially as described.

22. A lock stitch shoe sewing machine, having, in combination, a hooked needle, a looper, a take-up, a stationary elongated thread holder on the same side of the work as the needle, means for spreading the needle loop, and oscillating means for carrying the loop over the end of the thread holder, substantially as described.

23. A lock stitch shoe sewing machine, having, in combination, an oscillating curved hooked needle, a looper, a take-up, a stationary elongated substantially cylindrical thread holder on the same side of the work as the needle, an open casing substantially surrounding the thread holder and loosely holding it in operative position, means for preventing rotation of the thread holder in the open casing, and means for carrying the needle thread over the thread holder, substantially as described.

24. A lock stitch shoe sewing machine, having, in combination, a hooked needle, a looper, a take-up, a stationary thread holder on the same side of the work as the needle, means for holding the thread holder in operative position, an oscillating thread lifter for spreading the needle loop, and an oscillating thread-holder hook independent of the thread holder for carrying the loop over the thread holder, substantially as described.

25. A lock stitch shoe sewing machine, having, in combination, a hooked needle, a looper, a take-up, a stationary thread holder on the same side of the work as the needle, an open casing constituting the sole means for holding and retaining the thread holder in operative position, an oscillating thread lifter for spreading the needle loop, and an oscillating thread-holder hook for carrying the loop over the thread holder, substantially as described.

26. A lock-stitch shoe-sewing machine, having, in combination, an oscillating curved hooked needle, a looper, a take-up, a smooth cylindrical thread holder arranged in upright position and provided with a downwardly projecting thread delivery nose, and an open casing partially surrounding the thread holder and provided with a bottom member engaging and supporting the lower end of the thread holder and means for carrying the needle thread over the thread holder, substantially as described.

27. A lock stitch shoe sewing machine, having, in combination, an oscillating curved hooked needle, a looper, a take-up, a stationary elongated thread holder on the same side of the work as the needle, a thread lifter operating to spread the needle loop, and means for taking the needle loop from the thread lifter and carrying it over the end of the thread holder, substantially as described.

In testimony whereof I affix my signature, in presence of two witnesses.

MARSHALL HENRY PEARSON.

Witnesses:
ARTHUR BASS TALBOT,
ARTHUR PORTER.